United States Patent
Wright et al.

(10) Patent No.: US 10,711,329 B2
(45) Date of Patent: Jul. 14, 2020

(54) BERYLLIUM-FREE HIGH-STRENGTH COPPER ALLOYS

(71) Applicant: QuesTek Innovations LLC, Evanston, IL (US)

(72) Inventors: James A. Wright, Chicago, IL (US); Abhijeet Misra, Evanston, IL (US)

(73) Assignee: QuesTek Innovations LLC, Evanston, IL (US)

( * ) Notice: Subject to any disclaimer, the term of this patent is extended or adjusted under 35 U.S.C. 154(b) by 94 days.

(21) Appl. No.: 15/844,815

(22) Filed: Dec. 18, 2017

(65) Prior Publication Data

US 2018/0105898 A1 Apr. 19, 2018

Related U.S. Application Data (63) Continuation of application No. 12/415,510, filed on Mar. 31, 2009, now Pat. No. 9,845,520.

(51) Int. Cl.
  *C22C 9/06* (2006.01)
  *C22F 1/08* (2006.01)
  *F16C 33/12* (2006.01)

(52) U.S. Cl.
  CPC .............. *C22C 9/06* (2013.01); *C22F 1/08* (2013.01); *F16C 33/121* (2013.01)

(58) Field of Classification Search
  CPC ..................................... C22C 9/06; C22F 1/08
  USPC ......................................................... 148/686
  See application file for complete search history.

(56) References Cited

U.S. PATENT DOCUMENTS

| | | | |
|---|---|---|---|
| 4,012,240 A | 3/1977 | Hinrichsen et al. | |
| 4,016,010 A | 4/1977 | Caron et al. | |
| 4,052,204 A | 10/1977 | Plewes | |
| 4,073,667 A | 2/1978 | Caron et al. | |
| 4,315,538 A | 2/1982 | Nielsen | |
| 5,019,185 A * | 5/1991 | Nakajima | C22C 9/06 148/686 |
| 5,028,282 A | 7/1991 | Kubozono et al. | |
| 5,279,353 A | 1/1994 | Nielsen, Sr. et al. | |
| 5,288,457 A | 2/1994 | Boegel | |
| 5,816,090 A | 10/1998 | Hodge et al. | |
| 6,165,246 A | 12/2000 | Kira et al. | |
| 2002/0007879 A1 | 1/2002 | Nielsen, Jr. et al. | |

FOREIGN PATENT DOCUMENTS

| | | |
|---|---|---|
| EP | 411882 A1 | 2/1991 |
| JP | 418978 | 5/1966 |
| JP | 49105226 A2 | 10/1974 |

(Continued)

OTHER PUBLICATIONS

Jul. 18, 2016—Examination Report—App 09789553.6.

(Continued)

*Primary Examiner* — Melvin C. Mayes
*Assistant Examiner* — Christopher Douglas Moody
(74) *Attorney, Agent, or Firm* — Banner & Witcoff, Ltd.

(57) ABSTRACT

A beryllium-free high-strength copper alloy includes, about 10-30 vol % of $L1_2$-$(Ni,Cu)_3(Al,Sn)$, and substantially excludes cellular discontinuous precipitation around grain boundaries. The alloy may include at least one component selected from the group consisting of: Ag, Cr, Mn, Nb, Ti, and V, and the balance Cu.

2 Claims, 5 Drawing Sheets

(56) References Cited

FOREIGN PATENT DOCUMENTS

| JP | 5013492 B2 | 8/2012 |
|---|---|---|
| JP | 5013493 B2 | 8/2012 |
| JP | 5182414 B2 | 4/2013 |

OTHER PUBLICATIONS

Dec. 19, 2016—(EP) Examination Report—App 09789553.6.
Masamichi Miki and Yoshitsugu Amano, "Aging Characteristics of Cu-30% Ni—Al Alloys", Trans. Jim, 1979, vol. 20, pp. 1-10.
Grylls et al. "Strengthening of a cupronickel alloy by an order L12 phase", Intermetallics, 4, 1996, 567-570.
Zhao et al., Acta Metallurgica Inc., Spinodal Decomposition, Ordering Transformation, and Discontinuous Precipitation in a Cu—15Ni—8Sn Alloy, vol. 46, No. 12, pp. 4203-4218, 1998.
International Search Report and Written Opinion for PCT Application No. PCT/US2009/038958 dated Mar. 10, 2010.
Findik, Discontinuous (Cellular) Precipitation, Journal of Materials Science Letters 1998; 17: 79-83.
Hermann et al. Relationship bertween Microstructure and Mechanical Properties of a Spinodally Decomposing Cu—15Ni—8Sn Alloy Prepared by Spray Deposition, Metallurgical Transactions A 1994; 25: 1403-1412.
European Office Action of EP 09789553.6 dated Aug. 31, 2012.

\* cited by examiner

BERYLLIUM-FREE HIGH-STRENGTH COPPER ALLOYS

CROSS REFERENCE TO RELATED APPLICATION

This is a continuation application which claims priority of utility application Ser. No. 12/415,510 filed Mar. 31, 2009, U.S. Pat. No. 9,845,520 issued Dec. 19, 2017 entitled Beryllium-Free High-Strength Copper Alloys which is incorporated by reference herein and made part hereof.

FEDERALLY SPONSORED RESEARCH AND DEVELOPMENT

Activities relating to the development of the subject matter of this invention were funded at least in part by United States Government, Naval Air Warfare Center Contract No. N68335-07-C-0108, and thus may be subject to license rights and other rights in the United States.

BACKGROUND OF THE INVENTION

Copper-beryllium alloys achieve yield strength above 965 MPa (140 ksi) and are widely used in aerospace bushings. However, the U.S. Occupational Safety and Health Administration is calling for reductions in beryllium exposure, because its dust, if inhaled, can cause an often-fatal lung illness. The leading alternative to the copper-beryllium alloys is a copper-nickel-tin spinodal alloy such as Tough-Met®, but its yield strength, in the non-cold worked condition, is limited to 724 MPa (105 ksi). Another alternative is aluminum-bronze casting. The nominal composition of one existing aluminum-bronze alloy is 10.3 Al, 5.0 Ni, 2.8 Fe, and balance Cu, in wt %. However, its yield strength, in the as-cast condition, is limited to 431 MPa (63 ksi). Yet another alternative is manganese-bronze casting. The nominal composition of one existing manganese-bronze is 24.0 Zn, 6.2 Al, 3.8 Mn, 3.0 Fe, and balance Cu, in wt %. However, its yield strength, in the as-cast condition, is limited to 414 MPa (60 ksi). Thus, there has developed a need for beryllium-free high-strength copper alloys, with mechanical and tribological properties competitive to those of copper-beryllium alloys. Additionally, the properties should be achieved without cold working, to enable components requiring intricate machining or heavy cross-sections.

SUMMARY OF THE INVENTION

Aspects of the present invention relate to copper alloys strengthened by intragranular multicomponent intermetallic precipitates based on $L1_2$-$(Ni,Cu)_3(Al,Sn)$, useful for sliding wear applications, among others. According to some aspects, the alloys substantially exclude cellular discontinuous precipitation around grain boundaries. Cellular discontinuous precipitation around grain boundaries can affect the mechanical properties of the alloy deleteriously (See Findik, Journal of Materials Science Letters 1998; 17: 79-83, incorporated by reference herein).

According to other aspects, the alloys of the subject invention are suitable for production of large-scale ingots using conventional processing techniques known to persons skilled in the art. For some applications, the alloys can be centrifugally cast to near-net shape parts. The alloys can also be produced by processes such as EquaCast (See U.S. Pat. Nos. 4,315,538 & 5,279,353, and U.S. Patent Application 2002/0007879, incorporated by reference herein), Osprey spray deposition (See Hermann, Morris, Metallurgical Transactions A 1994; 25: 1403-1412, incorporated by reference herein), Pneumatic Isostatic Forging (See U.S. Pat. No. 5,816,090, incorporated by reference herein), powder metallurgy possibly employing hot isostatic pressing, and other casting techniques.

According to another aspect, a high-strength beryllium-free copper alloy includes 10-30 vol. % of a multicomponent intermetallic phase based on $L1_2$-$(Ni,Cu)_3(Al,Sn)$. Cellular discontinuous precipitation around grain boundaries is substantially excluded from the microstructure to promote ductility.

According to another aspect, a high-strength beryllium-free copper alloy includes, in combination by weight percent, about 19-24% Ni, about 3.0-6.5% Sn, about 1.2-1.9% Al, up to about 0.05% B, and may include at least one component X selected from the group consisting of: Ag, Cr, Mn, Nb, Ti, and V, and the balance Cu. The alloy includes a multicomponent intermetallic $L1_2$-$(Ni,Co,Cu)_3(Al,Sn,X)$ phase.

According to another aspect, a high-strength copper alloy includes an intermetallic Ni—V phase. The Ni—V phase precipitates directly from the melt and inoculates fine fcc grains. As a result, the grain diameter of the alloy as-cast can be below about 100 μm.

According to a further aspect, a heat treatment method is performed using a beryllium-free copper-based alloy that includes 10-30 vol % of a multicomponent intermetallic phase based on $L1_2$-$(Ni,Cu)_3(Al,Sn)$. The method includes subjecting the alloy to a two-step aging heat treatment, maintaining the first step of aging between 600° C. and the solvus temperature of the $L1_2$ phase (generally below 800° C.), and the second step of aging between 450 and 550° C. Alternatively, the alloy can be subjected to a slow cooling from the solutionizing temperature of around 850 to 900° C. to the aging temperature around 450 to 550° C. at cooling rates below about 80° C./minute.

Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which.

DESCRIPTION OF THE PREFERRED EMBODIMENT

Figure 1:
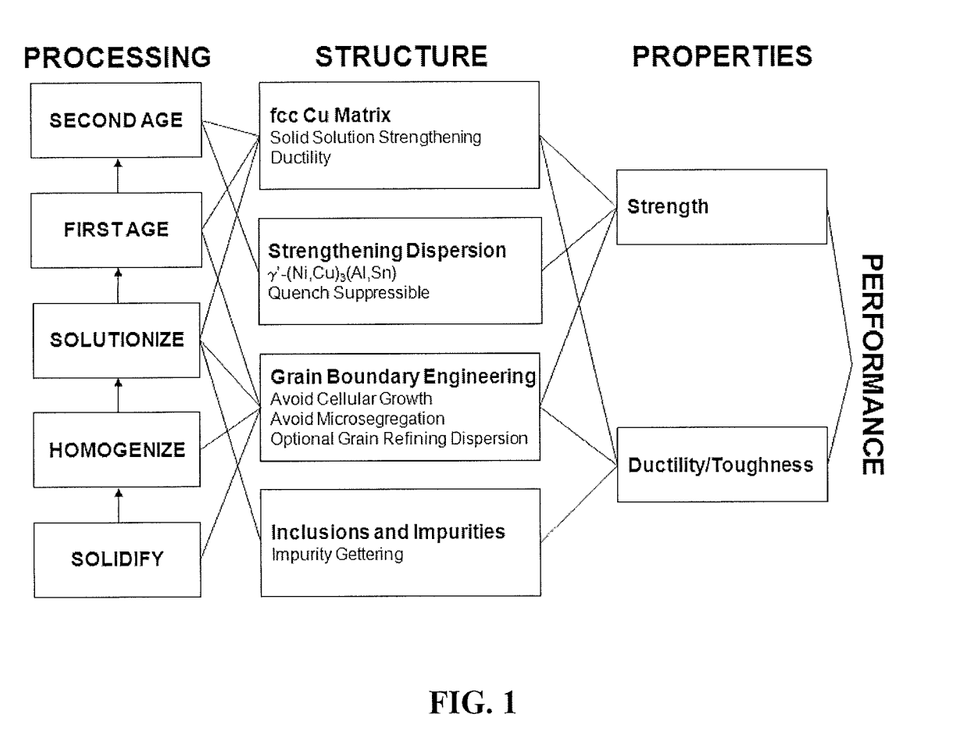
FIG. 1 is a systems design chart illustrating processing—structure—property relationships for one embodiment of the present invention.

FIG. 1 is a systems design chart illustrating processing—structure—property relationships according to one embodiment of the present invention. The desired performance for the application determines a set of alloy properties required. The disclosed alloys exhibit microstructural characteristics that can achieve the desired combination of properties and can be accessed through the sequential processing steps shown on the left of FIG. 1.

Figure 2:
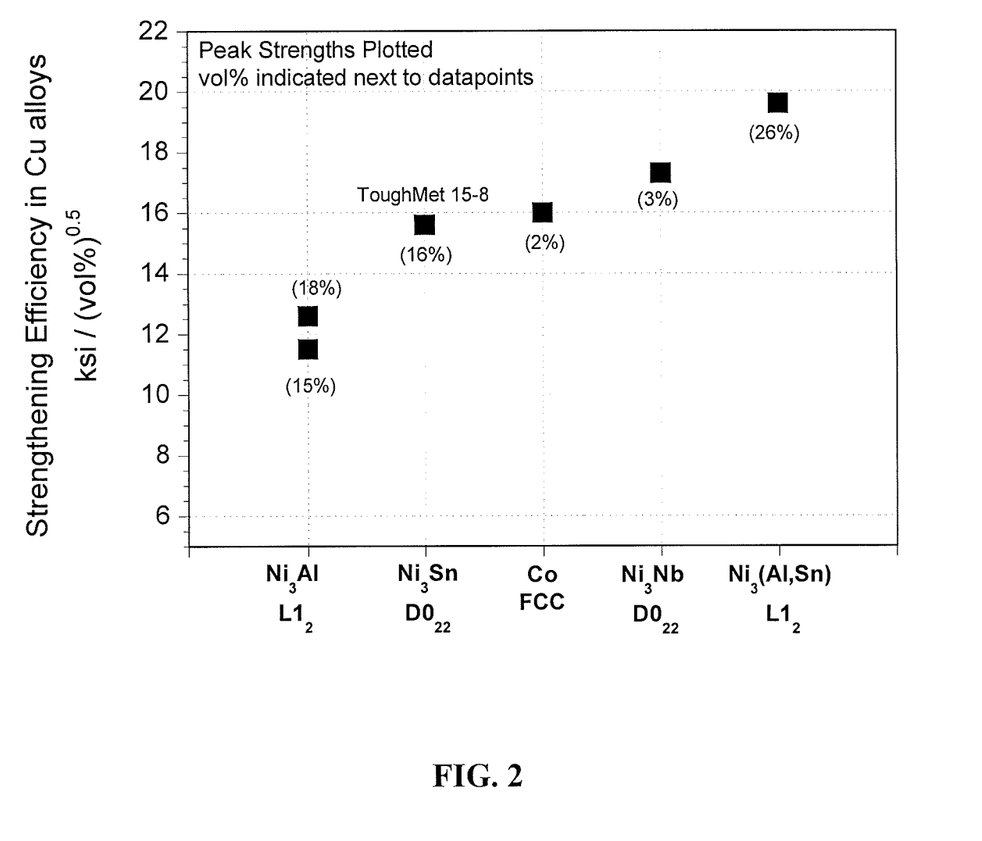
FIG. 2 is a graph showing the strengthening efficiency of different precipitates in fcc Cu-based matrix.
Figure 3:
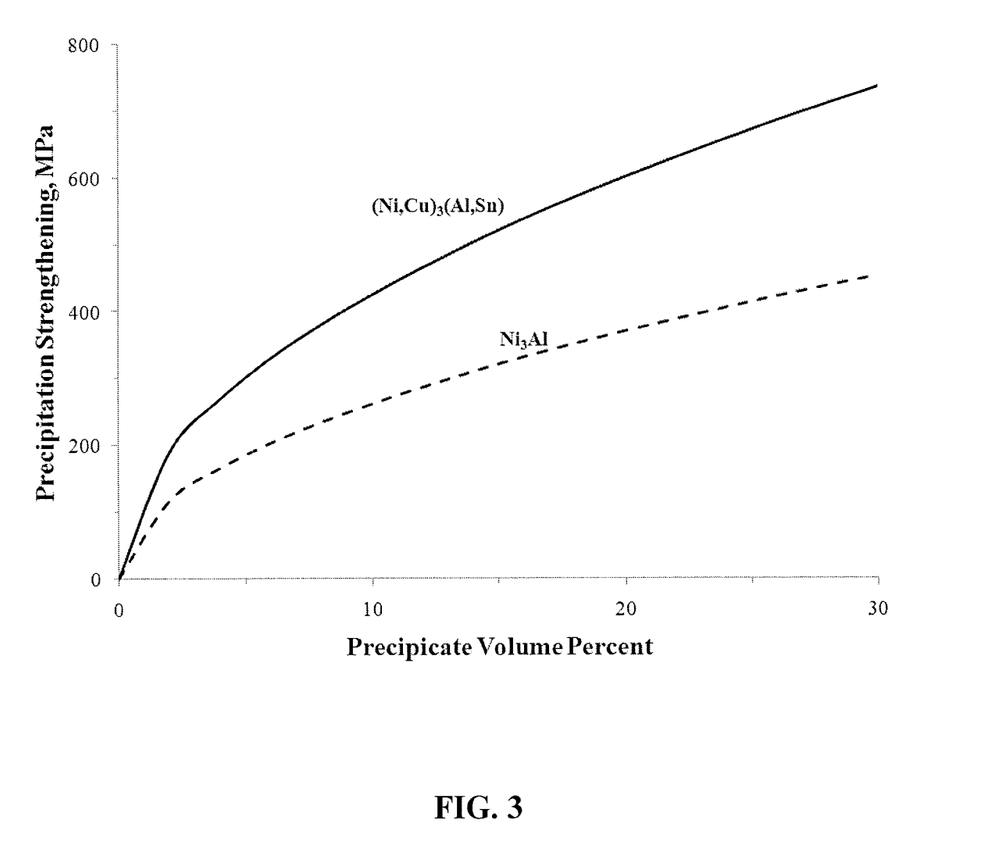
FIG. 3 is a graph comparing the precipitation strengthening of $Ni_3Al$ to that achieved by $Ni_3(Al,Sn)$ for various embodiments of the invention.

Aspects of the present invention relate to high-strength copper alloys, having a general absence of beryllium, and strengthened by multicomponent intermetallic precipitates based on $L1_2$-$(Ni, Cu)_3(Al,Sn)$. A variety of different precipitation strengthening mechanisms are currently used in Cu—Ni alloys. FIG. 2 illustrates strengthening efficiencies of several such precipitates. Precipitation strengthening with the intermetallic $L1_2$-$Ni_3Al$ phase is known in the art, but substantial improvement in strengthening efficiency of the $L1_2$ phase is desirable to achieve a viable non-toxic substitute for copper-beryllium alloys. Strengthening efficiency refers to the amount of precipitate phase fraction required to achieve a given yield strength. Low strengthening efficiency results in requiring a large amount of precipitate phase fraction, which in turn becomes hard to suppress during quenching following the solution treatment (prior to aging). Accordingly, in one embodiment, Cu—Ni alloys are provided that employ a multicomponent intermetallic phase based on $L1_2$-$(Ni,Cu)_3(Al,Sn)$ which exhibits a high strengthening efficiency, and the precipitation of this phase can be suppressed prior to aging. The multicomponent intermetallic phase may include an element taken or selected from the group of Ag, Cr, Mn, Nb, Ti, and V. FIG. 3 is a graph comparing the precipitation strengthening of $Ni_3Al$ to that achieved by $Ni_3(Al,Sn)$ for various illustrative embodiments of the invention. In one embodiment, the Cu—Ni alloys employ 10-30 vol % of the multicomponent intermetallic phase based on $L1_2$-$(Ni,Cu)_3(Al,Sn)$.

To increase the driving force of the $L1_2$-$(Ni,Cu)_3(Al,Sn,X)$ precipitates, in one embodiment, the mole fraction of nickel is constrained to be nearly equal to three times the mole fraction of Al, Sn, and X (X=Ag, Cr, Mn, Nb, Ti, and V) in the alloy. The disclosed alloys can be readily formed in the solution-treated condition and precipitation-strengthened. Additionally, in some embodiments, the alloy has a general absence of Be, to assist in achieving low toxicity, such as by limiting the content of Be to up to about 0.06 wt %.

In one embodiment, the alloy includes 10-30 vol % of a multicomponent intermetallic phase based on $L1_2$-$(Ni,Cu)_3(Al,Sn)$ phase. Cellular discontinuous precipitation around grain boundaries is substantially excluded from the microstructure to promote ductility. In another embodiment, the alloy is composed of about 19-24% Ni, about 3.0-6.5% Sn, about 1.2-1.9% Al, up to about 0.05% B, and may include at least one component X selected from the group consisting of: Ag, Cr, Mn, Nb, Ti, and V, where the alloy includes a multicomponent intermetallic $L1_2$-$(Ni,Co,Cu)_3(Al,Sn,X)$ phase. The alloy may contain up to about 1.0 wt. % of each included component X. In a further embodiment, the alloy includes at least about 10% Ni by weight and an intermetallic Ni—V phase. The Ni—V phase precipitates directly from the melt and inoculates fcc grains. As a result, the grain diameter of the alloy as-cast is up to about 100 μm in one embodiment such as 30.0 Ni, 2.0 V, and balance Cu, in wt %, and about 60-100 μm in another embodiment.

Table 1 lists nominal compositions of six prototype alloys, according to various embodiments of the invention. Alloys A, B, and C were prototyped by vacuum ingot metallurgy, while alloys D, E, F, and G were centrifugally cast without vacuum melting. All of the embodiment alloys A-G employ multicomponent intermetallic $L1_2$-$(Ni,Co,Cu)_3(Al,Sn,X)$ precipitates where X is taken or selected from the group of Ag, Cr, Mn, Nb, Ti, and V. Table 1 also includes measured peak properties after heat treatment for each listed alloy. The measured electrical conductivity (σ) is reported in % IACS (International Annealed Copper Standard).

TABLE 1

| wt % | Cu | Al | Ni | Sn | Ag | Co | Cr | Nb | Ti | V | B | VHN | YS (ksi) | σ |
|---|---|---|---|---|---|---|---|---|---|---|---|---|---|---|
| A | Bal. | 1.2 | 24 | 4.0 | — | — | — | — | — | 0.8 | 0.005 | 376 | 133 | N/A |
| B | Bal. | 1.5 | 19 | 6.5 | 1 | — | — | — | — | — | | 343 | — | N/A |
| C | Bal. | 2.0 | 20 | 5.0 | — | — | — | — | 0.1 | — | | 345-355 | 129 | N/A |
| D | Bal. | 1.5 | 19 | 6.5 | — | — | 0.5 | 0.2 | — | — | | 313-356 | 133 | N/A |
| E | Bal. | 1.2 | 24 | 4.5 | — | — | — | — | — | 0.8 | | 370 | | 6 |
| F | Bal. | 1.9 | 24 | 4.5 | — | 1.0 | — | 0.5 | — | — | | 312-366 | | N/A |
| G | Bal. | 1.9 | 24 | 3.0 | — | 1.0 | — | 0.5 | — | — | | 294-325 | | N/A |
| Miki | Bal. | 3.0 | 30 | — | — | — | — | — | — | — | | 281 | 104 | N/A |
| Tough Met | Bal. | — | 15 | 8.0 | — | — | — | — | — | — | | | 110 | N/A |

The prior alloy disclosed by Miki and Amano (Miki, Amano, *Mater Trans JIM* 1979; 20: 1-10) contains a large $L1_2$ phase fraction of 31%, yet shows a limited Vickers Hardness of 281 and an estimated yield strength of 717 MPa (104 ksi). However, the alloy embodiments A-G with $L1_2$ phase fractions below about 30%, show Vickers Hardness approaching, or in excess of 350, with yield strength of about 896 MPa (130 ksi). The high strengthening efficiency of these alloys was achieved by modifying the $L1_2$ phase with small additions of tin. The modified $L1_2$-$(Ni,Co,Cu)_3(Al,Sn,X)$ phase was confirmed with advanced high-resolution microstructural characterization techniques such as local electrode atom-probe analysis.

Prior references have taught away from the addition of tin to Cu—Ni alloys for this purpose, as the addition of tin can promote spinodal decomposition and precipitation of $Ni_3Sn$. Likewise, prior references have taught that tin-containing Cu—Ni alloys such as the ToughMet Cu-15Ni-8Sn alloy are difficult for homogenization and subsequent forging due to incipient melting. The incipient melting in such alloys is caused by the low-melting $D0_3$-$(Ni,Cu)_3Sn$ phase that is formed as the final solidification product due to microsegregation. However, the inventors have demonstrated that the disclosed alloys, if properly homogenized, can substantially dissolve the deleterious $D0_3$-$(Ni,Cu)_3Sn$ phase back into the solid solution. In one embodiment, a multistep heat treatment can be used to achieve homogenization, taking care that the first step of the homogenization treatment does not exceed the incipient melting temperature. Some examples of homogenizing heat treatments are described below and listed in Table 2, with respect to alloy E. After homogenization, alloys processed by ingot metallurgy can be hot-worked by conventional forging techniques, such as press forging or rotary forging at a temperature of about 775-850°

C. It is understood that these illustrative heat treatments, or other similar heat treatments, can be used effectively with a variety of tin-containing Cu—Ni alloys.

Prior alloys showed cellular discontinuous precipitation around grain boundaries. For example, the alloy disclosed by Miki and Amano showed such deleterious precipitation when aged at 600° C. for 20 minutes. The inventors have also demonstrated such deleterious precipitation in an experimental alloy with the nominal composition of 12.0 Ni, 2.0 Al, and balance Cu, in wt %, aged at 500° C. for 4 hours. However, this deleterious precipitation can be substantially excluded in the embodiment alloys disclosed herein. Subsequent to the homogenization treatment, the alloy can be subjected to an aging treatment. In one embodiment, a dual-step aging treatment is used, including a first aging treatment at a temperature between 600° C. and the solvus temperature of the $L1_2$ phase (generally below 800° C.) for 30-60 minutes, and a second aging treatment at ~450-550° C. for 8-16 hours. In one embodiment the first aging treatment is performed at ~700° C. and the second aging treatment is performed at ~500° C. The first aging treatment precipitates $L1_2$ particles at the grain boundaries, which effectively prevents grain boundary migration during the second aging treatment. This treatment prevents subsequent cellular discontinuous precipitation around grain boundaries which affects the mechanical properties deleteriously. Alternatively, in one embodiment, the alloy can be subjected to a slow cooling, such as described in U.S. Pat. No. 4,016,010 (incorporated by reference herein), from the solutionizing temperature around 850 to 900° C. to the aging temperature around 450 to 550° C. at cooling rates below about 80° C./minute.

Figure 4A:
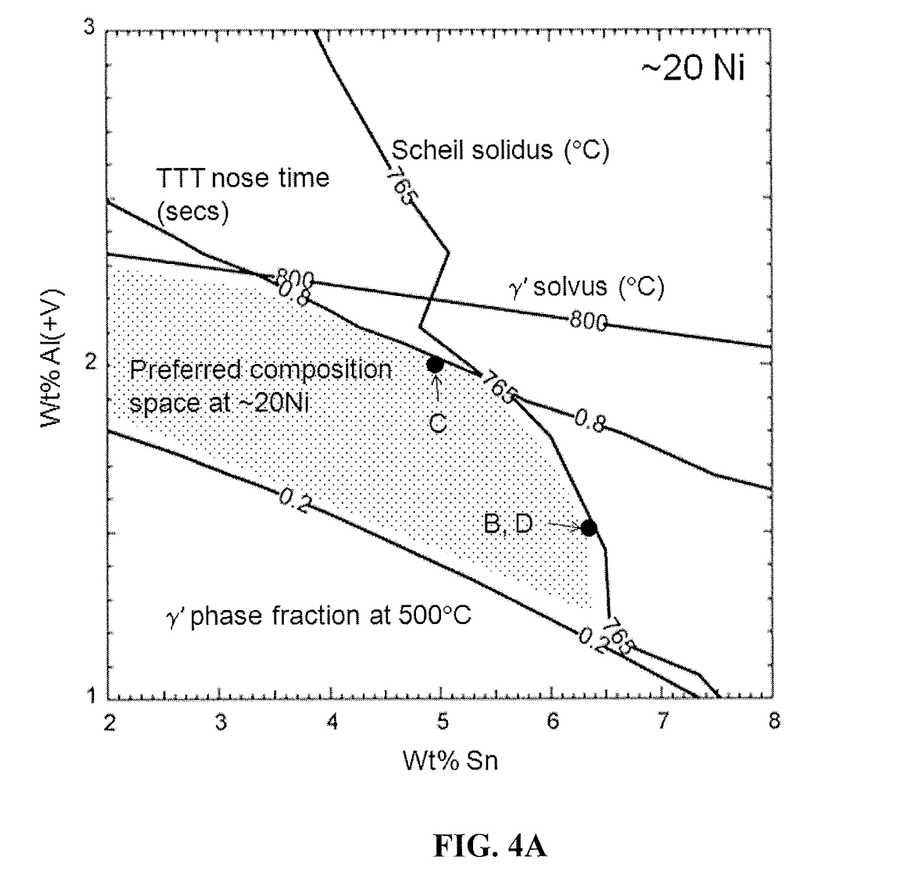
FIGS. 4A and 4B are composition diagrams showing composition windows according to various embodiments of the invention.
Figure 4B:
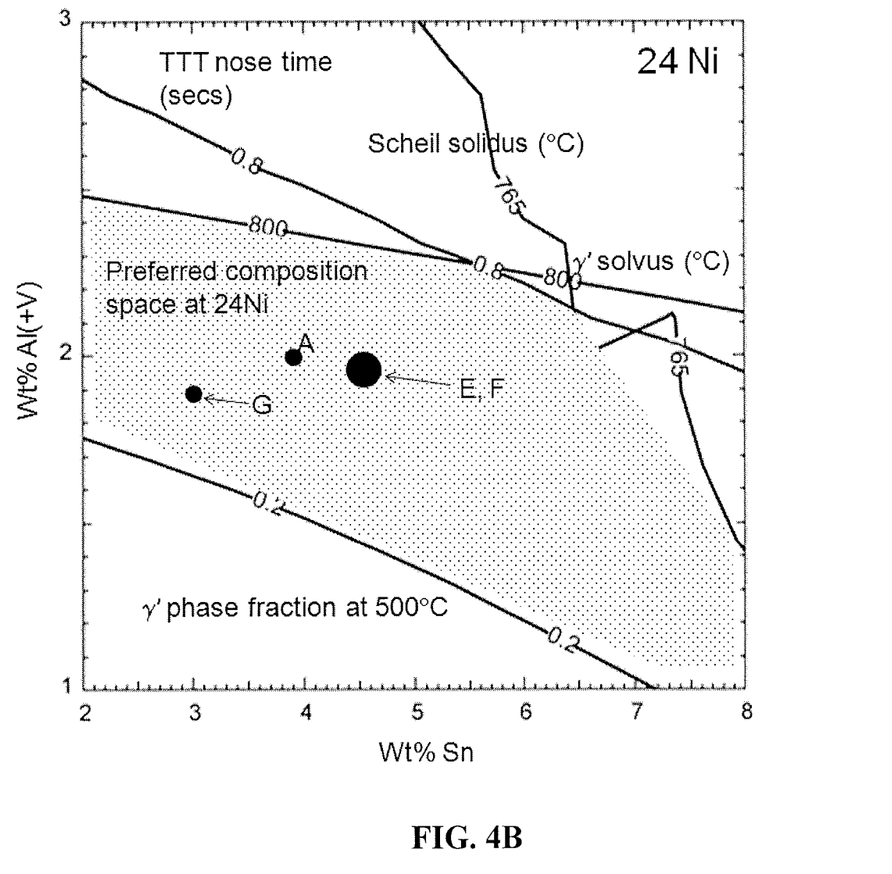

FIGS. 4A and 4B are composition diagrams showing illustrative composition windows according to various illustrative embodiments of the invention, defined by calculated processability and microstructural parameters. The upper bound on Sn is partly defined by the calculated Scheil solidification temperature, to ensure subsequent homogenization and hot-workability. The lower bounds for Al and Sn are shown for an alloy embodiment having an $L1_2$ phase fraction above about 20%. The upper bounds for Al and Sn are designed to ensure quench suppressibility from the homogenization/solution temperature, and are influenced by the solvus temperature of the $L1_2$ particles, which can be kept to <800° C. to ensure a hot-working window. It is evident that each of alloy embodiments A-G fall within the composition windows shown in FIGS. 4A and 4B.

By selecting the concentration of nickel, tin, and aluminum, various embodiments of the disclosed alloys can be produced having at least about 10% by volume $L1_2$ phase at the aging temperature of 500° C. In addition, the embodiment alloy A employs small amounts of boron, which can improve the grain-boundary cohesion. The embodiment alloy B employs small amounts of silver, which can improve the wear resistance, and Ni—V particles that precipitate directly from the melt and can refine the grain size through in-situ fcc grain inoculation. The embodiment alloy C employs small amounts of titanium, which can improve the strengthening efficiency of the $L1_2$ precipitates. The embodiment alloy D employs small amounts of niobium, which can refine the grain size with $Ni_3Nb$ precipitates, and small amounts of chromium, which can augment strengthening with Cr precipitates. The embodiment alloy E employs Ni—V particles that precipitate directly from the melt and refine the grain size through in-situ fcc grain inoculation. The in-situ inoculation results in a fine grain size as cast, for example 60-100 μm in diameter, which in turn can result in a dramatic improvement in fracture behavior. The embodiment alloys F and G employ small amounts of cobalt, which can augment the strengthening with fcc-Co precipitates. Representative tensile properties of the vanadium-containing alloy embodiment E (Table 1) are shown in Table 2 below. As described above, various combinations of homogenization treatments and aging treatments were conducted using samples of alloy embodiment E, and the specific homogenization and aging treatments used are identified in Table 2. Each data point represents the average of two measurements. As seen from Table 2, the multistep homogenization treatment improves tensile elongation over single-step short-time homogenization treatments.

TABLE 2

| Homogenization Treatment | Aging Treatment | UTS (ksi) | 0.2% YS (ksi) | Elongation % | RA % |
|---|---|---|---|---|---|
| 850° C./ 1 hr + WQ | 700° C./ 30 min + WQ + 500° C./ 8 hr + WQ | 142 | 131 | 1.0 | 4.0 |
| 850° C./ 2 hr + WQ | -do- | 142 | 134 | 1.0 | 3.3 |
| 850° C./ 4 hr + WQ | -do- | 143 | 133 | 1.0 | 2.8 |
| 700° C./8 hr + 750° C./16 hr + 800° C./8 hr + 825° C./16 hr + WQ | -do- | 141 | 133 | 2.7 | 3.9 |

Following are examples of the experiments relating to development of the alloy of the invention:

Example 1

Alloy A

A vacuum induction melt of alloy A was prototyped by vacuum ingot metallurgy. The alloy was subjected to a multi-step homogenization treatment with first step at 700° C. for 8 hours, the second step at 750° C. for 16 hours, and the third step at 825° C. for 16 hours, followed by a water quench. The alloy was then pancake-forged to ~60% height reduction at a temperature of 825° C. The alloy was then subjected to a solutionizing heat treatment at 825° C. for 2 hours, quenched with water, and then subjected to a sub-solvus two-step aging heat treatment with the first step of aging at 700° C. for 30 minutes followed by a water quench and the second step of aging at 500° C. for 8 hours followed by a water quench. The tensile yield strength of alloy A in this condition was about 910 to 930 MPa (132 to 134 ksi), which is comparable to copper-beryllium alloys. Furthermore, alloy A in this condition showed an elongation of 3 to 8%, superior to as-cast Cu—Be alloys which show an elongation of only 1% at similar strength levels.

Example 2

Alloy B

A 30-lb vacuum induction melt of alloy B was prototyped by vacuum ingot metallurgy. The alloy was hot-rolled after melting and homogenization. The alloy was subsequently subjected to a sub-solvus two-step aging heat treatment. The Vickers Hardness Number was measured for various aging conditions, as shown in Table 3 below. A representative result is also shown in Table 1.

TABLE 3

|  |  | First |  |
| --- | --- | --- | --- |
|  | Second | 700° C. 30 min | None |
| 500° C. | 4 hr | 343 | 403 |
|  | 8 hr |  | 451 |
| 550° C. | 4 hr |  | 349 |
|  | 8 hr |  | 316 |

Example 3

Alloy C

A 30-lb vacuum induction melt of alloy C was prototyped by vacuum ingot metallurgy. The alloy was hot-rolled after melting and homogenization. The alloy was subjected to a solutionizing heat treatment at 900° C. for 1 hour, quenched with water, then subjected to a sub-solvus two-step aging heat treatment, and quenched with water. The Vickers Hardness Number was measured for various aging conditions, as shown in Table 4 below. Representative results are also shown in Table 1.

TABLE 4

|  |  | First | | | | | |
| --- | --- | --- | --- | --- | --- | --- | --- |
|  |  | 750° C. | | 775° C. | | 800° C. | |
| Second | | 30 min | 60 min | 30 min | 60 min | 30 min | 60 min |
| 500° C. | 8 hr | 363 |  | 361 | 361 | 362 | 352 |

The yield strength and ultimate tensile strength (UTS) were also measured for samples of alloy C. For these measurements, the alloy was subjected to a solutionizing heat treatment at 850-900° C. for 2 hours, quenched with water, then subjected to a sub-solvus two-step aging heat treatment with first step of aging at 650-750° C. for 30 minutes followed by a water quench and the second step of aging at 500° C. for 4-8 hours followed by a water quench. The yield strength of alloy C was about 830 to 890 MPa (120 to 129 ksi) and UTS was about 920 to 985 MPa (133 to 143 ksi), which are comparable to copper-beryllium alloys.

Example 4

Alloy D

Alloy D was centrifugally cast without vacuum melting. The casting weighed about 140 pounds and measured 5 inches in height, 15.25 inches in outer diameter, and 11.25 inches in inner diameter. The alloy was subjected to a multi-step homogenization treatment with the first step at 825° C. for 8 hours followed by the second step at 900° C. for 16 hours. The alloy was then subjected to a sub-solvus two-step aging heat treatment. The Vickers Hardness Number was measured for various aging conditions, as shown in Table 5 below. Representative results are also shown in Table 1.

TABLE 5

|  |  | First | | | | | |
| --- | --- | --- | --- | --- | --- | --- | --- |
|  |  | 600° C. | | 650° C. | | 700° C. | |
| Second | | 30 min | 60 min | 30 min | 60 min | 30 min | 60 min |
| 500° C. | 8 hr | 325 | 339 | 324 | 353 | 349 | 336 |
|  | 16 hr | 332 | 331 | 332 | 358 | 356 | 342 |
| 550° C. | 4 hr | 313 | 325 | 320 | 333 | 333 | 327 |
|  | 8 hr | 316 | 326 | 329 | 336 | 324 | 331 |

Example 5

Alloy E

Alloy E was centrifugally cast without vacuum melting. The casting weighed about 140 pounds and measured 5 inches in height, 15.25 inches in outer diameter, and 11.25 inches in inner diameter. The addition of vanadium in alloy E promoted the formation of Ni—V particles, which in turn inoculated fcc grains and successfully refined the grain size, resulting in a grain diameter of about 60-100 μm. The alloy was subjected to a multi-step homogenization treatment with the first step at 900° C. for 8 hours followed by the second step at 950° C. for 16 hours. The alloy was then subjected to a sub-solvus two-step aging heat treatment. The Vickers Hardness Number was measured for various aging conditions, as shown in Table 6 below. A representative result is also shown in Table 1.

TABLE 6

|  |  | First | | | | | |
| --- | --- | --- | --- | --- | --- | --- | --- |
|  |  | 600° C. | | 650° C. | | 700° C. | |
| Second | | 30 min | 60 min | 30 min | 60 min | 30 min | 60 min |
| 500° C. | 8 hr | 339 | 327 | 369 | 364 | 370 | 355 |
|  | 16 hr | 372 | 327 | 362 | 373 | 383 | 368 |
| 550° C. | 4 hr | 347 | 293 | 325 | 339 | 344 | 337 |
|  | 8 hr | 352 | 311 | 329 | 333 | 321 | 350 |

The yield strength and UTS were also measured for samples of alloy E. For these measurements, the alloy was subjected to a multi-step homogenization treatment with the first step at 700° C. for 8 hours, the second step at 750° C. for 16 hours, the third step at 800° C. for 8 hours, and the fourth step at 825° C. for 16 hours, followed by a water quench. The alloy was then subjected to a sub-solvus two-step aging treatment with the first step of aging at 700° C. for 30 minutes followed by a water quench and the second step of aging at 500° C. for 8 hours followed by a water quench. The compressive yield strength of alloy E in this condition was about 920 MPa (133 ksi) and UTS was about 970 MPa (141 ksi), which are comparable to copper-beryllium alloys. Furthermore, alloy E in this condition showed an elongation of 2.7%, superior to as-cast Cu—Be alloys which show an elongation of only 1% at similar strength levels. The elongation of alloy E is further expected to improve to about 40% upon an optional cold working.

Example 6

Alloy F

Alloy F was centrifugally cast without vacuum melting. The casting weighed about 162 pounds and measured 10.5 inches in height, 13 inches in outer diameter, and 9 inches in inner diameter. The alloy was subjected to a multi-step homogenization treatment with the first step at 900° C. for 8 hours followed by the second step at 950° C. for 16 hours. The alloy was then subjected to a sub-solvus two-step aging heat treatment. The Vickers Hardness Number was measured for various aging conditions, as shown in Table 7 below. Representative results are also shown in Table 1.

TABLE 7

|  |  | First | | | | | |
|---|---|---|---|---|---|---|---|
|  |  | 600° C. | | 650° C. | | 700° C. | |
| Second | | 30 min | 60 min | 30 min | 60 min | 30 min | 60 min |
| 500° C. | 8 hr | 348 | 334 | 348 | 355 | 366 | 360 |
|  | 16 hr | 353 | 343 | 356 | 360 | 365 | 364 |
| 550° C. | 4 hr | 312 | 325 | 334 | 341 | 348 | 335 |
|  | 8 hr | 337 | 338 | 346 | 340 | 350 | 355 |

Example 7

Alloy G

Alloy G was centrifugally cast without vacuum melting. The casting weighed about 162 pounds and measured 10.5 inches in height, 13 inches in outer diameter, and 9 inches in inner diameter. The alloy was subjected to a multi-step homogenization treatment with the first step at 900° C. for 8 hours followed by the second step at 950° C. for 16 hours. The alloy was then subjected to a sub-solvus two-step aging heat treatment to prevent cellular discontinuous precipitation around grain boundaries. The Vickers Hardness Number was measured for various aging conditions, as shown in Table 8 below. Representative results are also shown in Table 1.

TABLE 8

|  |  | First | | | | | |
|---|---|---|---|---|---|---|---|
|  |  | 600° C. | | 650° C. | | 700° C. | |
| Second | | 30 min | 60 min | 30 min | 60 min | 30 min | 60 min |
| 500° C. | 8 hr | 289 | 278 | 298 | 296 | 317 | 325 |
|  | 16 hr | 303 | 288 | 296 | 295 | 307 | 321 |
| 550° C. | 4 hr | 272 | 261 | 276 | 260 | 265 | 325 |
|  | 8 hr | 285 | 274 | 297 | 289 | 294 | 302 |

The various embodiments of Cu—Ni alloys disclosed herein provide benefits and advantages over existing alloys, including existing Cu—Be alloys. For example, the alloys provide high strength, high hardness, good corrosion resistance, good wear resistance, good stability at elevated temperatures, and high electrical and thermal conductivity, while avoiding toxicity problems. Accordingly, the disclosed alloys may be a possible replacement for load-bearing bushings where high strength and low coefficient of friction are desirable to maximize wear resistance. Additionally, the disclosed alloys may also be suitable for use in oil and gas drilling components where a combination of good corrosion resistance, high strength, and low coefficient of friction is desirable, and for elevated temperature applications approaching the final tempering temperature, which is higher than the alternative CuBe or CuNiSn alloys. Further, the disclosed alloys may also be considered for applications where the inherent electrical or thermal conductivity of copper-based alloys is desirable. Still further, the disclosed alloys may be considered for non-magnetic spring applications where a combination of high spring resilience and low toxicity is desirable. Other benefits and advantages are readily recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. Accordingly, while the specific examples have been illustrated and described, numerous modifications come to mind without significantly departing from the spirit of the invention and the scope of protection is only limited by the scope of the accompanying claims.

What is claimed is:

1. A method for manufacture of an essentially beryllium (Be) free copper based alloy comprising by volume 10%-30% of a multicomponent, intermetallic phase based on a $L1_2$-$(Ni,Cu)_3(Al,Sn)$ microstructure comprising the steps of:
   (a) forming an ingot consisting essentially of by weight percent 19-24% nickel (Ni), 3-6.5% tin (Sn), 1.2-2.0% aluminum (Al), optionally up to 1% by weight of at least one element (X) selected from the group consisting of silver (Ag), chromium (Cr), manganese (Mn), niobium (Nb), titanium (Ti) and vanadium (V), no more than 0.06% beryllium (Be), no more than 0.05% boron (B) and the balance copper (Cu), and
   (b) heat treating the alloy by an aging heat treatment including at least a first step and a second step, wherein the first step includes heating the alloy to a temperature between 600° C. and the solvus temperature of the $L1_2$ phase kept below and less than 800° C. and the second step includes heating the alloy to a temperature between 450 and 550° C.

2. The method of claim 1 further including at least one homogenization step at about 850° to 900° C. before the aging steps.